(12) United States Patent
Bonitz et al.

(10) Patent No.: US 7,860,588 B2
(45) Date of Patent: Dec. 28, 2010

(54) METHOD AND APPARATUS FOR POSITIONING A FEEDER NEEDLE, AND FEEDER

(75) Inventors: Ralf Bonitz, Stadecken-Elsheim (DE); Peter Duerolf, Grünberg (DE)

(73) Assignee: Schott AG, Mainz (DE)

( * ) Notice: Subject to any disclaimer, the term of this patent is extended or adjusted under 35 U.S.C. 154(b) by 1098 days.

(21) Appl. No.: 11/142,710

(22) Filed: Jun. 1, 2005

(65) Prior Publication Data
US 2006/0010925 A1    Jan. 19, 2006

(30) Foreign Application Priority Data
Jun. 1, 2004    (DE)    .................. 10 2004 026 932

(51) Int. Cl.
*G05B 19/18*    (2006.01)
*B67D 7/58*    (2010.01)
*B05C 11/00*    (2006.01)

(52) U.S. Cl. .............................. 700/62; 65/379; 222/55; 222/519; 222/594; 222/596; 118/680; 118/692; 427/8; 702/41

(58) Field of Classification Search ................... 65/379, 65/405, 408; 222/592, 596, 598, 477, 1, 222/55, 402.21, 506, 519, 594, 595, 630; 700/61; 702/34, 41; 118/663, 680, 692; 427/8
See application file for complete search history.

(56) References Cited

U.S. PATENT DOCUMENTS

| | | | | |
|---|---|---|---|---|
| 4,274,859 A | * | 6/1981 | Mumford | ...................... 65/314 |
| 4,551,163 A | * | 11/1985 | Duga et al. | .................... 65/129 |
| 5,242,408 A | * | 9/1993 | Jhuboo et al. | ................ 604/152 |
| 5,808,203 A | * | 9/1998 | Nolan et al. | ................... 73/700 |
| 6,610,364 B1 | * | 8/2003 | Kweon et al. | ............... 427/256 |
| 2005/0224050 A1 | * | 10/2005 | Schmitfranz et al. | ......... 123/446 |

FOREIGN PATENT DOCUMENTS

| | | |
|---|---|---|
| JP | 6212618 | 1/1987 |
| JP | 11157847 A | 6/1999 |
| WO | WO99/14166 | 3/1999 |

OTHER PUBLICATIONS

Office Action dated Jan. 27, 2010 corresponding to Japanese Patent Application No. 2005-161380.

* cited by examiner

*Primary Examiner*—Paul L Rodriguez
*Assistant Examiner*—Sheela Rao
(74) *Attorney, Agent, or Firm*—Ohlandt, Greeley, Ruggiero & Perle, LLP

(57) ABSTRACT

The invention relates to a method and an apparatus for positioning a feeder needle, and to a production line for optical components, in which a feeder needle of an apparatus for portioning fluid material, preferably softened glass, in particular of a needle feeder, has its position relative to a seat for the feeder needle recorded by means of a force-measuring device, and to further apparatuses which realize this method and to objects produced by the process.

29 Claims, 3 Drawing Sheets

METHOD AND APPARATUS FOR POSITIONING A FEEDER NEEDLE, AND FEEDER

CROSS-REFERENCE TO RELATED APPLICATIONS

This application claims the benefit under 35 U.S.C. §119 of German Application No. 10-2004-026-932.7-45, filed Jun. 1, 2004, the entire contents of which are incorporated by reference herein.

BACKGROUND OF THE INVENTION

1. Field of the Invention

The invention relates to a method and an apparatus for positioning a feeder needle, and to a feeder comprising this needle; the invention also relates to a production line for optical components.

2. Description of Related Art

Feeders which have been disclosed hitherto, in particular needle feeders, have long been used for portioning, for example, heated and liquefied glass, and usually have a portioning accuracy of ±3 grams.

Nowadays, however, even higher portioning accuracies are required for the production of glass engineering items, such as for example gobs for lens manufacture or for the manufacture of optical components.

Patent Abstracts of Japan 11-157847 relating to a "Device and method for supplying molten glass" disclose the accurate positioning of a feeder needle with spring assistance. However, one drawback of this holding means is that due to the fixed spring forces either positioning can only be carried out slowly to avoid mechanical damage to the feeder needle seat, or high levels of wear to the valve have to be accepted. High levels of wear result in leaks, which may require intervention on the part of the operator and can lead to apparatus down times. Furthermore, the fixedly set spring has difficulty reacting to thermal changes or positioning tolerances of the needle with the required degree of accuracy.

It is an object of the invention to achieve a higher accuracy of portioning with a needle feeder; in this context, it would be advantageous to achieve a portioning accuracy of ±50 mg or even a higher accuracy, however, without being forced to accept significantly increased wear or inaccurate positioning of the needle in its seat as well as resulting inaccurate portioning.

BRIEF SUMMARY OF THE INVENTION

This object is achieved in a surprisingly simple way by the method and apparatuses of the present disclosure.

Hitherto, the closing of the valve of a feeder for glass has substantially not yet been recorded by measurement means, because of difficulties due to the prevailing temperatures, and the correct positioning of the feeder needle was detected only by the glass flow-out.

However, the invention can be used to record the closing operation itself, and as a result significantly more accurate closing operations are possible, even with dynamic control.

The invention is described in more detail below with reference to the drawings and on the basis of preferred and particularly preferred embodiments.

DETAILED DESCRIPTION OF THE INVENTION

The following detailed description of preferred embodiments refers to the drawings which, however, for the sake of clarity are not to scale.

Figure 1:
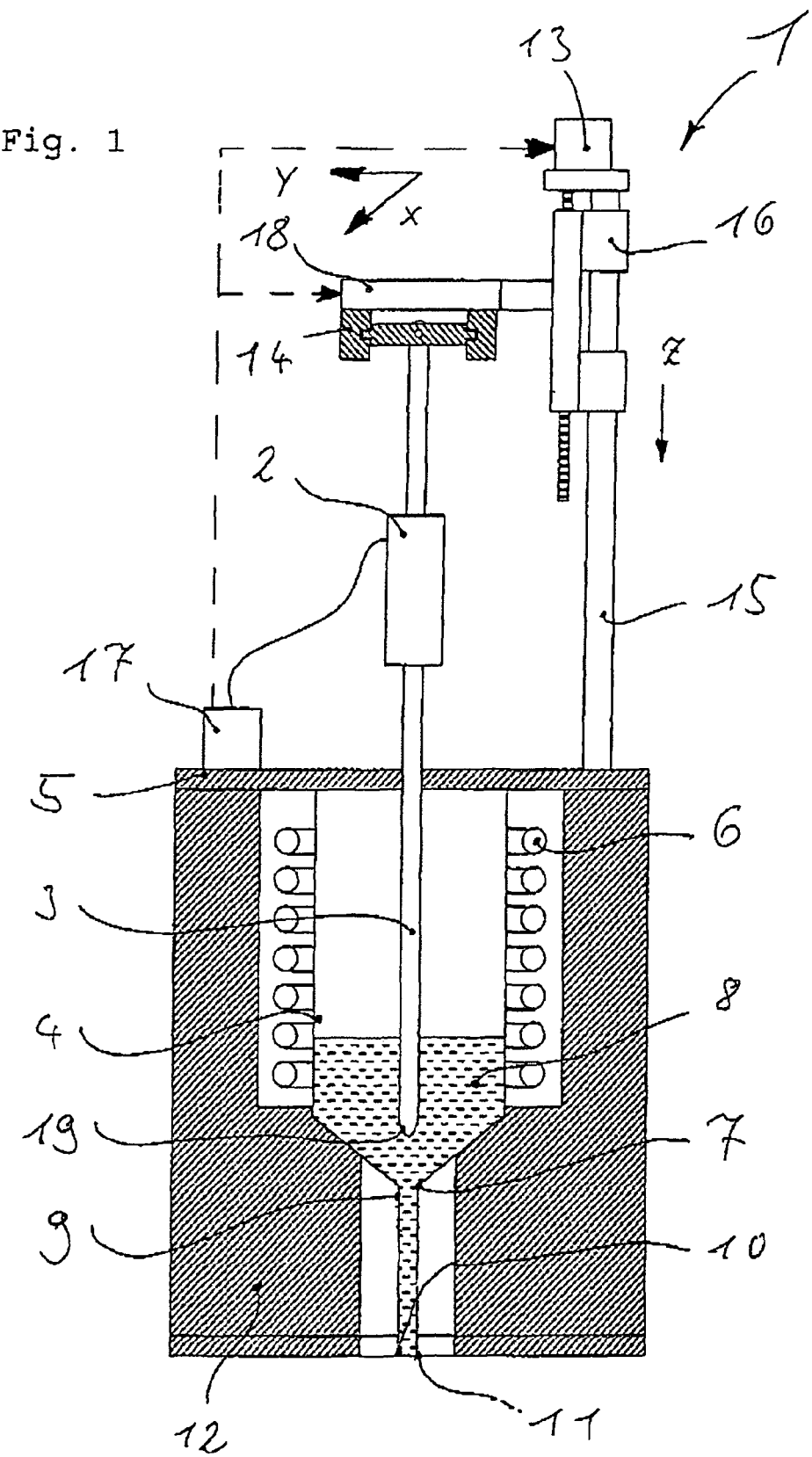
FIG. 1 shows a first embodiment of an apparatus for portioning fluid material, in particular softened glass, having a force-measuring device which records forces that arise during positioning of the feeder needle in its position relative to a seat for the feeder needle, in which the feeder needle is suspended in universally jointed fashion.

Furthermore, reference is made to the reference system shown in FIG. 1, in which the arrows define x, y and z directions, encompassing an x-y plane which extends substantially perpendicular to the longitudinal direction of a feeder needle 3; in this reference system, the z direction extends substantially parallel to the longitudinal axis of the feeder needle 3.

In the context of the present description, the term positioning is to be understood as meaning the movement of the feeder needle 3 to its correct position, in particular to its correct operating position.

In this context, the term positioning encompasses
a) the initial adjustment of the position of the feeder needle 3 in the x-y plane or its repeated adjustment during operation, and
b) the initial adjustment of the movement of the feeder needle in closing or opening direction or its repeated adjustment during operation, in particular the initial adjustment of the vertical position of the feeder needle or its repeated adjustment during operation.

The feeder needle is considered as correctly positioned, if it adopts a position in the x-y plane in which, as a result of the needle movement in the z direction, the valve, comprising feeder needle 3 and valve seat 7, opens and closes correctly, and preferably little wear occurs while the desired portioning accuracy is achieved.

The positioning according to the invention accounts for thermal expansion, mechanical wear, as well as any change of feeder needle position in relation to its seat during operation, i.e. changes of the operating valve.

The positioning described below can be carried out successfully for needles of needle feeders that are suspended flexibly, in particular in universally jointed fashion, as well as for needles which are suspended in a rigid position.

The following text refers to FIG. 1, which shows a first embodiment of an apparatus 1 for portioning fluid material, in the present instance for portioning softened glass, which has a force-measuring device 2 that can measure forces acting on a feeder needle 3.

Furthermore, the apparatus 1 has a reservoir 4 for fluid material 8, which can be heated by means of a heating device 6.

The heating device 6 is used to heat preferably glass sufficiently far above the glass temperature Tg that the glass softens and has a viscosity in a preferred range, for example a range of less than 100 dPas.

As a result of the feeder needle 3 being moved in opposite z direction, the feeder needle seat 7 can be opened at the lower end of the reservoir 4, which preferably narrows in a funnel shape, causing the heated glass 8 to pass from the reservoir 4 into an outflow device which is in particular of tubular configuration, namely the feeder tube 9.

At the lower end of the feeder tube 9, a detachment device 10 is arranged from which the fluid material is released to a further production facility; the detachment device 10 comprising a nozzle 11 or a defined edge.

The further production facility (not shown in the figures) may be an optical pressing facility, in particular a precision pressing facility, for the production of gobs, optical components, in particular of lenses, Fresnel lenses and/or planes, in particular plane-parallel plates.

In an alternative configuration, the detachment device 10 is arranged directly beneath the feeder needle seat 7, and no feeder tube 9 is needed. As a result, the portioned material is released directly to the further production facility without passing through an outflow device.

The reservoir 4 and preferably also the tubular outflow device as well as the heating device 6 are surrounded by thermally insulating refractory material, and thus allow very accurate temperature setting of the reservoir 4, the tubular outflow device and the material 8 located therein.

Figure 4:
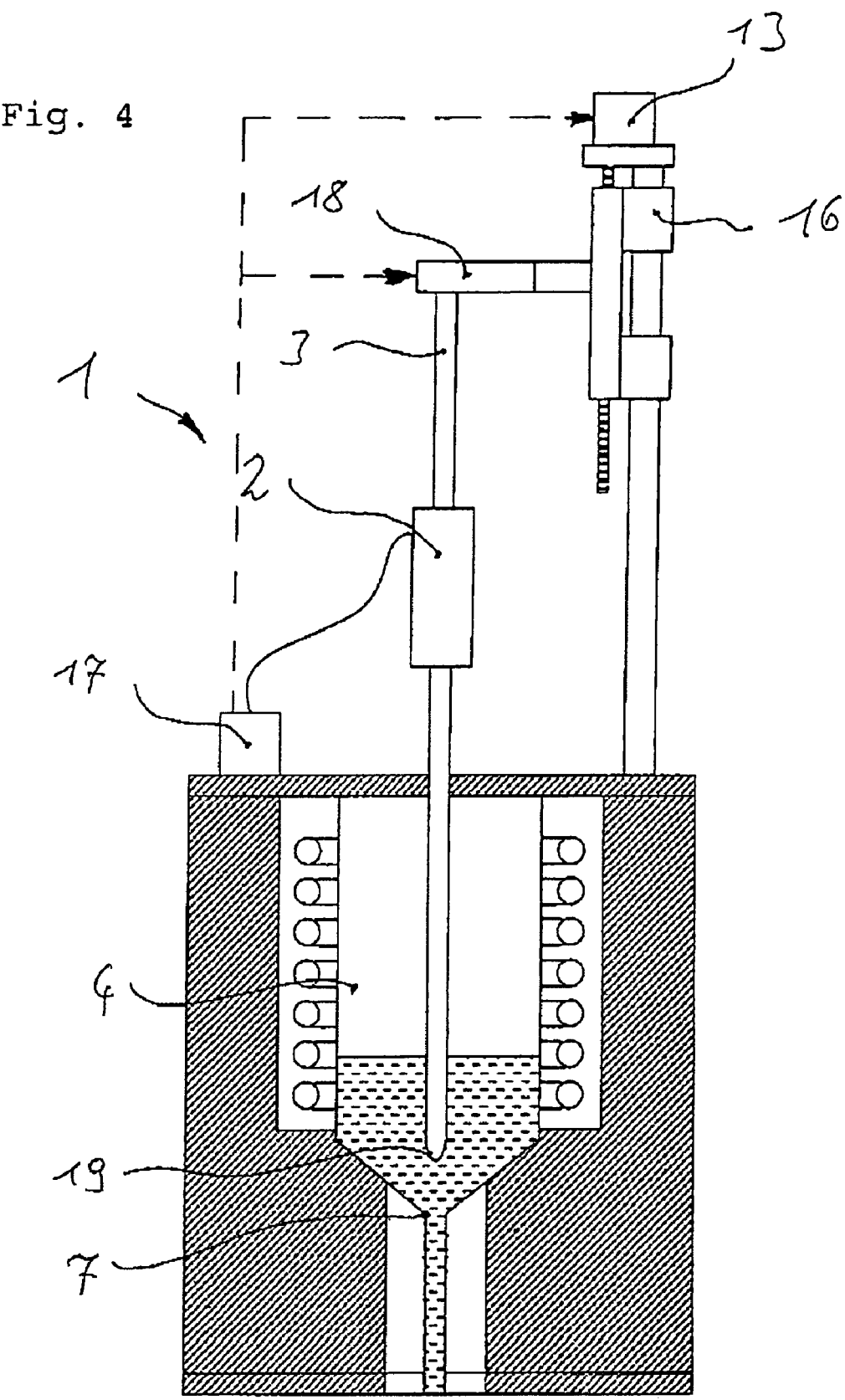
FIG. 4 shows a second embodiment of an apparatus for portioning fluid material, in particular softened glass, having a force-measuring device, in which the feeder needle is suspended in mechanically fixed fashion.

In addition, both the apparatus 1 shown in FIG. 1 and the apparatus 1 shown in FIG. 4 may have a device for controlling the level of the material 8, such that the pressure above the feeder needle seat 7 can be maintained with a high level of accuracy, preferably by adding softened material or batch that is to be melted.

In the first preferred embodiment, illustrated in FIG. 1, the feeder needle 3 is held pivotably on a boom 13 by means of a universally jointed suspension 14.

The boom 13 has a mast 15, which is held in a mechanically fixed position relative to the reservoir 4 and to which an accurate longitudinal displacement means being movable in the z direction 16 is fitted. Said displacement means can preferably be actuated and moved by a servomotor means via a control device (not shown in the figures). This control device may be local or linked, particularly preferred a central process control device with which a person skilled in the art will be familiar.

Furthermore, the longitudinal displacement means 16 has displacement sensors which record its precise position in the z direction and transmit this position to a recording and memory device 17.

The universally jointed suspension 14 of the first embodiment is arranged fixedly on an x-y displacement device 18, which can be moved in a defined manner in x and y directions, and the x-y displacement device 18 being itself attached fixedly to the displacement device 16.

The x-y displacement device 18 also has position indicators, by means of which x-y device positions can be recorded and transmitted to the recording and memory device 17.

Furthermore, the x-y displacement device 18 preferably has servomotor drive units, and the x-y displacement device 18 can be positioned in a defined way by the control device (not shown in the drawings).

This arrangement allows the feeder needle 3 to be moved in x, y and z directions as well as to record and store the respective position data in the recording device 17.

Furthermore, the velocity and the acceleration of the feeder needle can be determined, either continuously or for defined time intervals, by means of a plurality of position measurements which are executed timely defined to one another.

This allows excessively high or low velocities of the feeder needle 3 and dangerous accelerations or acceleration which enhance wear to be recorded.

In particular, velocity or acceleration of the feeder needle tip 19 in the z direction can be restricted to a maximum value by transmitting the velocity value to the control device, which then limits the velocity by controlling the longitudinal displacement means 16.

By this configuration undesirably high forces cab be avoided if the feeder needle tip 19 comes into contact with parts of the reservoir 4, in particular with the feeder needle seat 7.

Furthermore, if the location of the feeder needle 3 is known, it is possible to define regions in which very high velocities in x, y and z directions are permitted as well as regions, for example in the vicinity of the walls of the reservoir 4, in which only low velocities are used, in particular velocities, which avoid damage to the feeder needle 3 and the reservoir as well as the seat 7.

Figure 2:
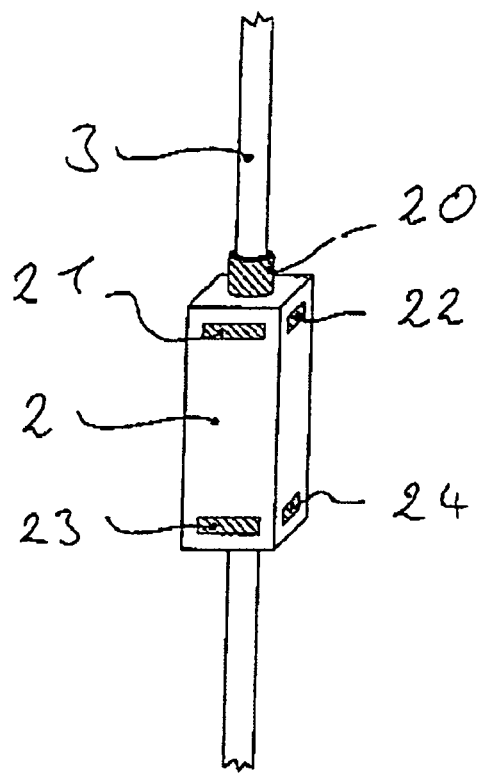
FIG. 2 shows a detail illustration depicting an example of a force-measuring device at a feeder needle.

The following text refers to FIG. 2, which shows a highly schematic illustration of the force-measuring device 2 fitted to the feeder needle 3.

The force-measuring device 2 has a force-measuring device 20 which measures in z direction and is illustrated, purely by way of example, as a cylindrical piezoelectric element.

Furthermore, the force-measuring device 2 has a force-measuring device 21, which measures forces in x direction and a force-measuring device 22, which measures forces in y direction.

The respective force-measuring devices may comprise one or a plurality of force-measuring devices. By way of example, a further force-measuring device 23 in x direction and a further force-measuring device 24 in y direction are illustrated in FIG. 2.

The respective force-measuring devices may have wire strain gages, piezoelectric measuring devices, as well as other measuring devices.

As an alternative to the illustration presented in FIGS. 1 and 4, the force-measuring device 2 may also be arranged at the upper end of the feeder needle 3 or at some other location along its axial extent.

The following text refers to FIG. 4, in which identical references as in FIG. 1 indicate identical or similar assemblies.

In contrast to the universally jointed suspension 4 illustrated in FIG. 1, the second preferred embodiment depicts a feeder needle 3, which is mechanically rigid connected to x-y displacement device 18.

This allows undesirable swaying movements of the feeder needle 3, which are produced, for example from flows in the fluid material 8, to be suppressed to a greater extent than when using the universally jointed suspension.

Regarding this embodiment, it is particularly advantageous to continuously carry out the monitoring of the signals from the force-measuring devices 20 to 24.

The Transmission of these signals to the control device and the intervention of the control device on the x-y displacement device 18 as well as on the longitudinal displacement means 16 allows the feeder needle 3 to be stopped or moved in the opposite direction to the instantaneous direction of movement as soon as excessive forces occur, and thus to avoid damage and excessive wear.

To provide a better understanding of the forces and force-measuring signals, which are described in the following, reference is made to the illustration presented in FIG. 3, which shows an enlarged cross-sectional view of a disproportionately tilted feeder needle 3 in the feeder needle seat 7.

Such an arrangement of the feeder needle 3 relative to its valve seat 7, albeit usually not so strongly inclined, may occur if the feeder needle 3 is not correctly positioned as described below.

Figure 3:
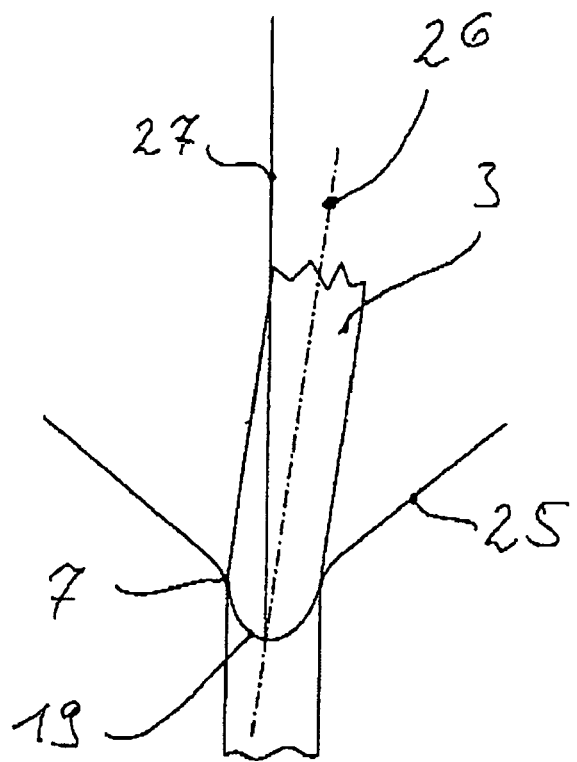
FIG. 3 illustrates an overly tilted feeder needle in its seat, in order to exemplify arising forces.

If positioned correctly and contrary to the illustration in FIG. 3, the feeder needle 3 will be in an untilted position when the valve is closed, i.e. in a position in which the longitudinal axis 26 parallels the z direction or the auxiliary line 27 shown in FIG. 3. The lateral contact between the feeder needle tip 19 and the valve seat 7 then results in a low-wear, reliably sealed closed position.

The following text describes how this positioning is achieved by use of the force measurement signals.

If the feeder needle 3 is displaced in the z direction relative to a position illustrated in FIGS. 1 and 4, its tip 19, if it is laterally offset relative to the seat 7, for example in the negative y direction as illustrated in FIG. 4, may strike a lower side region 25 of the reservoir 4.

From this, both a force in z direction and a force in y direction act on the feeder needle 3, in particular on its tip 19. These forces are recorded by the force device 20 measuring in z direction and the force-measuring devices 22 and 24 measuring in y direction. The simultaneous occurrence of forces in z direction and of forces in y direction indicate that the feeder needle 3 is incorrectly positioned or has collided with the reservoir 4.

A feeder needle 3, which has been correctly positioned in the x and y directions, would substantially only generate a force signal in the force-measuring device 20, i.e. only in the z direction, when displaced in z direction.

Furthermore, not only the direction of the force measurement signals but also the time profile and the strength of these signals can be used to ascertain whether the feeder needle 3 has been correctly positioned.

If a laterally mispositioned feeder needle 3 is displaced in z direction relative to the position illustrated in FIGS. 1 and 4 and the feeder needle tip 19 comes into contact with the lower lateral region of the reservoir 4, then the resulting force signal in z direction is weaker, and generally does not rise as strongly in a given time interval, compared to when the feeder needle tip 19 is correctly positioned in the lateral direction and comes into contact with the feeder needle seat 7.

Due to the universally jointed suspension 14 and the limited mass of the feeder needle 3, the laterally mispositioned feeder needle tip 19 may be deflected laterally by the funnel-shaped lower region of the reservoir 4. Although the resulting force signal may show a relatively strong rise, this rise will subsequently decay relatively quickly on account of the deflection of the feeder needle 3 in the fluid material 8. Furthermore, the extent of the rise is limited, since the apparatus according to the invention complies with velocity or acceleration limit values, and consequently maximum limits of applied forces are not exceeded.

However, the lateral deflection of the feeder needle 3 described above does not occur if the feeder needle 3 is correctly positioned in the lateral direction and then displaced in the z direction.

If the longitudinal axis 26 of the feeder needle 3 coincides with the auxiliary line 27, i.e. the feeder needle 3 is correctly positioned in x and y directions, the feeder needle tip 19 comes into contact with the feeder needle seat 7 substantially simultaneously over the whole of a front annular region, resulting in an immediate and generally very steep rise in forces in z direction.

Furthermore, since a lateral deflection of the feeder needle 3 is impossible, the level of the force signal in z direction will not decrease, as it would be the case if the needle position was tilted, and in addition to the steeper increase, the static forces in z direction might be considerably higher.

Especially in the latter case, the force signal in the z direction, in particular if the feeder needle 3 is immobile, can give information as to whether the feeder needle is correctly seated in a sealing position, since the forces in z direction are also a measure of the closing forces, which act at the feeder needle tip 19 in the feeder needle seat 7.

The apparatuses as described above and the methods as described below can particularly advantageously be used for the production of optical components, such as for example lenses, Fresnel lenses and/or plane, in particular plane-parallel, plates with very accurately defined masses.

From this significant benefits for the hot-shaping are achieved, since, in particular in the case of precision pressing, very accurate shapes can be used and excessive or insufficient dimensions are reliably avoidable, which otherwise would result in incorrect component dimensions.

In the following, the method according to the invention is described in more detail basing on preferred embodiments.

At the start of the positioning operation, the feeder needle 3 is advantageously adjusted as accurately as possible in the x-y plane, for example by using values of a correct position stored in the memory device 17 or by optical or mechanical checking of the distances from the walls of the reservoir 4 and from the seat 7.

The adjustment in the x-y plane can be carried out in cold or unheated state of the fluid material 8, which is to be softened by the supply of heat, while the further positioning can be carried out after the fluid material 8 has been heated and softened.

In a first embodiment of the method according to the invention, the force acting in x and y directions is measured by the force-measuring device, which records in x and y directions, such as for example wire strain gages or piezoelectric transducers, and while the feeder needle is closing, the zero value for the two measured values is searched for by means of a trial-and-error method.

This search may either be carried out randomly or intelligent search strategies may be applied, which are able to recognize the direction of readjustment on the basis of changing measurement signals.

By way of example, first of all the feeder needle can be moved in the x direction until a local minimum value has been recognized, and then the feeder needle can be fixed in this x position.

Afterwards, the feeder needle can be moved in the y direction until a local minimum value has been recognized, and the feeder needle can then be fixed in this y position.

Next, another x and then another y movement can be carried out until the x and/or y value drops below a predetermined limit value or even reaches zero.

If this zero value for both directions is achieved, the feeder needle 3 does not sway any further during closing, which indicates that only a substantially perpendicular lifting movement is executed.

These or other search strategies can be used in this embodiment as well as in the embodiments described below.

Furthermore, an x-y position recognized as optimum can be stored in the recording and memory device 17 in order to be used at the start of a further positioning operation as a starting value.

The measurement device 20, which records in the z direction can then reliably and permanently record the closing force of the feeder needle 3 in the seat 7.

This method and the other methods described below can be operated by means of a control loop, which is driven by electric servomotor means.

Servomotor drives are able to perform positioning operations, which are fast yet nevertheless permanently accurate, since mechanical acceleration forces, which would otherwise have to be applied by the valve seat can be absorbed by the servomotor drive. In particular due to the known position of the feeder needle, the control device can effect a very fast, yet nevertheless reliable movement of the feeder needle.

The time-continuous recording of the forces in the z direction allows to avoid damage to the needle seat anytime, since the forces, which occur during the closing operation, are permanently monitored, such that excessively high closing forces can be avoided.

Furthermore, the actuation by the servomotor means allows optimum force profiles to be programmed as fixed values or to be used as defined set point values within a control loop.

In this context, the universally jointed suspension 14 of the feeder needle 3 is advantageous in order to support the free swaying of the feeder needle and its self-aligning tracking in case of minor misalignments.

Furthermore, previously stored values can be used as predetermined coarse adjustment for the starting point of the positioning, the actual positioning then merely requires precision adjustment.

The accurate needle guidance allows shallower valve characteristics to be realized, which again results in an enhanced positioning accuracy.

The accurate needle guidance moreover allows the regions of the feeder needle and of the seat of the feeder needle, which together actually form the valve, to be more closely matched to one another in terms of shape, such that the opening cross section decreases or increases more quickly in the event of a movement of the feeder needle towards or away from the valve seat, respectively.

According to the invention, a wide range of geometries, which are matched to one another can be used as valves in this context.

Furthermore, the shape of the z force signal can provide information as to the condition of the valve. A signal, which rises accurately and quickly may indicate the correct function, while a blurred or more slowly rising signal may represent a misalignment or the occurrence of wear. In this case, the misalignment can be checked with the aid of the x and y signals, and the statement provided by the z signal can be validated.

In a simplified embodiment, the x and y signals are dispensed with, and solely the shape of the z signal provides all the values required.

If the feeder needle has not yet been positioned correctly in the x and y directions, it has to execute a swaying movement which is superimposed on the lifting movement, and within the needle seat, initially the needle has to execute a rubbing movement until it finally reaches its seated position. Following the detection of such a rubbing movement, it may be terminated by means of a movement in the x-y plane opposite to the preceding movement.

While displacing the feeder needle 3 in the x and y directions, a tilting or swaying movement and a rubbing movement can be recorded in the z force signal, namely as an initially low force for the z direction, which then suddenly rises when the closed position is reached, and which is recorded by the force measurement signal in the z direction, in particular as a rise of the force in the z direction.

It is possible to use trial-and-error methods or the intelligent search methods described above to find the position of the needle in which a swaying movement no longer occurs, such that the needle is correctly positioned in the x and y directions, its z force signal correspondingly indicating a steep rise, only, when the feeder needle reaches the correctly closed position of the valve.

In general, the shape of the z force signal can also be used to provide information as to the state of the valve comprising the feeder needle 3 and the feeder needle seat 7.

The above description has made reference to a system of Cartesian coordinates with an x-y plane and a z direction; however, the invention is not restricted to this system; by way of example, it is also possible for forces in other coordinate systems, for example in polar coordinate systems or in spherical coordinate systems, to be utilized in accordance with the invention.

Furthermore, instead of measuring the force measurement signal in the z direction, it is also possible to measure a single radial signal, for example the radial signal from a cylindrical piezoelectric transducer.

The invention claimed is:

1. A method for positioning a feeder needle for portioning fluid material, comprising:
    contacting the feeder needle with walls of a reservoir comprising the fluid material or with a feeder needle seat within the reservoir;
    measuring a force acting on the feeder needle in an x, y and/or z direction, which arises due to the contacting the feeder needle, at least during positioning of a tip of the feeder needle relative to the feeder needle seat during a closing operation;
    recording the measured force; and
    using the measured force as guidance information for positioning the needle.

2. The method as claimed in claim 1, further comprising initially moving the feeder needle in an x-y plane that runs substantially perpendicular to a longitudinal axis of the feeder needle and then moving the feeder needle in a closing direction that runs substantially parallel to the longitudinal axis.

3. The method as claimed in claim 2, wherein the forces acting on the feeder needle are measured during the movement of the feeder needle in the x-y plane.

4. The method as claimed in claim 3, wherein the feeder needle is moved in a continuous manner or in a stepwise manner in the closing direction during a movement that takes place continuously or in intervening periods between movements carried out in a stepwise manner in the x-y plane.

5. The method as claimed in claim 4, further comprising searching for a zero value for the force in the x and y directions by a trial-and-error method during movement of the feeder needle in the closing direction or during pauses in the movement in the closing direction.

6. The method as claimed in claim 5, wherein the movement of the feeder needle in the x and y directions is carried out on the basis of a random pattern.

7. The method as claimed in claim 5, wherein the movement of the feeder needle in the x and y directions is carried out by an search strategy that recognizes the direction of further continuous or stepwise movement in the x and y directions from a change in measurement signals from the force.

8. The method as claimed in claim 7, further comprising moving the feeder needle first in the x direction until a local minimum value of the force is recognized and holding the feeder needle in position at the local minimum value, then moving the feeder needle in the y direction until a local minimum value of the force is recognized and holding the feeder needle in position at the local minimum value.

9. The method as claimed in claim 8, further comprising displacing the feeder needle a defined amount in the z direction after movement to the position at the local minimum value.

10. The method as claimed in claim 9, further comprising repeating the movement to the position at the local minimum value until the local minimum value measured in the x and/or y direction drops below a predetermined limit value.

11. The method as claimed in claim 10, further comprising storing an x-y position at the local minimum value in a memory device as a starting value for the start of a further positioning operation.

12. The method as claimed in claim 11, further comprising recording a closing force of the feeder needle relative to the seat.

13. The method as claimed in claim 1, further comprising suspending the feeder needle from a universally jointed suspension so that the feeder needle can sway freely and boost self-aligning tracking of the tip in the event of misalignment.

14. The method as claimed in claim 11, further comprising using the starting value for the start of further positioning of the feeder needle in a cold or unheated state of the fluid material, and wherein the further positioning is carried out after heating and softening of the fluid material.

15. The method as claimed in claim 12, further comprising using the closing force to provide information as to a state of a valve comprising the feeder needle and the seat.

16. The method as claimed in claim 1, further comprising recording a tilting or swaying movement as a rise in the force in the z direction.

17. The method as claimed in claim 16, further comprising moving the feeder needle in a direction opposite to the direction of movement of the feeder needle in the x-y plane in response to the force in the z direction.

18. The method as claimed in claim 17, further comprising moving the feeder needle in the closing direction during movement of the feeder needle in the x-y plane.

19. The method as claimed in claim 15, further comprising recognizing a closed state of the feeder needle in the seat by virtue of a relatively quickly and/or strongly rising force in the z direction.

20. The method as claimed in claim 15, wherein the movement of the feeder needle in the x and y directions is carried out on the basis of a random pattern.

21. The method as claimed in claim 15, wherein the movement of the feeder needle in the x and y directions is carried out using an search strategy that uses a change in the force in the z direction to recognize a direction of readjustment in the x and y directions.

22. An apparatus for portioning fluid material, comprising:
a force-measuring device by which a force acting on a feeder needle in an x, y and/or z directions, which arises due to contact of the feeder needle with the walls of the reservoir comprising the fluid material or with a feeder needle seat within the reservoir, can be measured at least during part of a positioning of the feeder needle relative to the feeder needle seat during a closing operation; and
a recording device for recording the measured forces in order to use the measured forces as guidance information for position the feeder needle.

23. The apparatus as claimed in claim 22, further comprising a device for moving the feeder needle in the x, y and/or z directions.

24. The apparatus as claimed in claim 23, wherein the device for moving the feeder needle is operated by servomotor in the x, y and z directions.

25. The apparatus as claimed in claim 22, wherein the recording device records the forces as a function of a location or velocity of the feeder needle in the x, y and/or z directions.

26. The apparatus as claimed in claim 25, further comprising a memory device for storing the forces recorded by the recording device.

27. The apparatus as claimed in claim 22, further comprising a suspension for suspending the feeder needle in a universally jointed fashion.

28. The apparatus as claimed in claim 22, further comprising a suspension for suspending the feeder needle in a rigid position.

29. The apparatus as claimed in claim 23, further comprising a control device that can be used to evaluate the force and to actuate the device for moving the feeder needle.

* * * * *